UNITED STATES PATENT OFFICE.

BRUNO RICHARD SEIFERT AND OTTO WILHELM MEVES, OF RADEBEUL, NEAR DRESDEN, GERMANY, ASSIGNORS, BY MESNE ASSIGNMENTS, TO HEYDEN CHEMICAL WORKS, OF NEW YORK, N. Y.

SODIUM FORMALDEHYDE SULFOXYLATE.

No. 887,050.     Specification of Letters Patent.     Patented May 5, 1908.

Application filed November 21, 1905. Serial No. 288,370. (Specimens.)

*To all whom it may concern:*

Be it known that we, BRUNO RICHARD SEIFERT and OTTO WILHELM MEVES, subjects of the King of Saxony, and residents of Radebeul, near Dresden, Kingdom of Saxony, German Empire, have invented a new and useful Improvement in the Manufacture of Sodium Formaldehyde Sulfoxylates, of which the following is a specification.

It has been stated that formaldehyde hydrosulfite salts can be produced of any reducing power situated between the reduction of 0.8 gram up to 2.2 grams of indigo by 1 gram of formaldehyde hydrosulfite sodium by acting with 1 to 2 equivalents of sulfurous acid upon a mixture of 1 to 2 equivalents of an aldehyde and 1 equivalent of zinc dust or iron. It is necessary that the quantity of the sulfurous acid be equivalent to the quantity of the aldehyde. Thus, if 2 equivalents of formaldehyde are caused to react with 1 equivalent of zinc dust and 2 equivalents of sulfurous acid, the reaction takes place according to the following equation:

I. 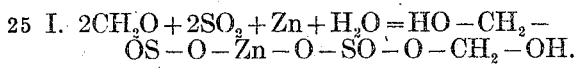

If however, 1 equivalent of formaldehyde is caused to react with 1 equivalent of zinc dust and 1 equivalent of sulfurous acid, the reaction takes place according to the following equation:

II. 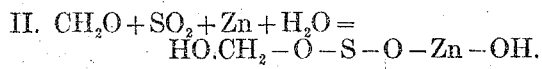

The zinc salt obtained according to equation I, is easily soluble in water, while that obtained according to equation II, is difficultly soluble. These zinc salts, by a solution of soda, can be transformed into the sodium salts which can be obtained in dry state by evaporating *in vacuo*. The sodium salt obtained from the zinc salt of equation II, reduces twice the quantity of indigo which is reduced by the sodium salt obtained from the zinc salt of equation I.

If 1½ equivalents of $SO_2$ and 1½ equivalents of formaldehyde are caused to react with 1 equivalent of zinc dust, a salt is obtained whose reducing power lies midway between the above mentioned two. Any quantities of sulfurous acid and formaldehyde lying between 1 and 2 equivalents can be caused to act upon 1 equivalent of zinc dust. It is necessary that the quantity of the sulfurous acid be equivalent to the quantity of the formaldehyde. In this way, products of a reducing power are obtained lying between the above mentioned limits.

The formaldehyde may be replaced by other aldehydes, for example acetaldehyde or benzaldehyde. The product of highest decolorizing power is obtained according to the following example:

Example: Into a well stirred mixture of 65 kilos of zinc dust and 80 kilos of a solution of formaldehyde of 40 %, sulfurous acid is poured, until the zinc dust has disappeared; about 53 kilos of $SO_2$ are necessary for this purpose. The reaction takes place according to the equation:

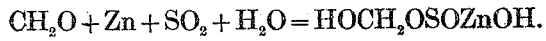

The resulting paste of the difficultly soluble zinc salt is directly ready for use. It may also be filtered, washed and dried *in vacuo*. To obtain the product herein claimed, it is, however, reacted with soda lye or a solution of sodium carbonate and thus transformed into the corresponding sodium salt which is easily soluble in water. The solution is separated by filtration from the precipitate of zinc carbonate and then evaporated *in vacuo* until crystallization sets in.

If evaporation *in vacuo* is continued until the mass turns to a thick crystalline paste, and the liquid part of this paste is separated from the crystalline in the usual way, for example by means of centrifuge, a crystalline salt is obtained which represents the salt $OH-CH_2-OSONa$ without any water of crystallization except the small quantity of water contained in the small quantity of the liquid part which remains in the crystals after the hot crystalline paste has passed the centrifuge. One gram of this new salt decolorizes from 1.9 up to 2.2 grams of indigo. It forms white, loose crystals, melting at about 135 to 140° centigrade, soluble in cold water, insoluble in cold and in hot absolute methylalcohol.

What we claim is:

A formaldehyde sulfoxylate sodium salt $OH-CH_2-OSONa$ free of crystal water, melting at a temperature of about 135° to 140° centigrade, easily soluble in water and reducing from 1.9 fold to the 2.2 fold of its weight of indigo, substantially as described.

In testimony that we claim the foregoing as our invention we have signed our names in presence of two witnesses this eighth day of November 1905.

BRUNO RICHARD SEIFERT.
OTTO WILHELM MEVES.

Witnesses:
PAUL E. SCHILLING,
EMIL FEISSLER.